(No Model.)

M. J. SMITH.
POTATO PLANTER.

No. 543,107. Patented July 23, 1895.

Witnesses.
A. Ruppert.
H. A. Daniels.

Inventor:
Melvin J. Smith
Per
Thomas P. Simpson

UNITED STATES PATENT OFFICE.

MELVEN J. SMITH, OF BAYPORT, MICHIGAN.

POTATO-PLANTER.

SPECIFICATION forming part of Letters Patent No. 543,107, dated July 23, 1895.

Application filed November 27, 1894. Serial No. 530,124. (No model.)

*To all whom it may concern:*

Be it known that I, MELVEN J. SMITH, a citizen of the United States, residing at Bayport, in the county of Huron and State of Michigan, have invented certain new and useful Improvements in Potato Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a potato-planter by which the seed may be dropped at regular intervals in the furrow, the furrow made of any preferred depth, and the seed properly covered with fine soil. I employ one driver and one feeder, planting about eight acres per diem.

Figure 1:
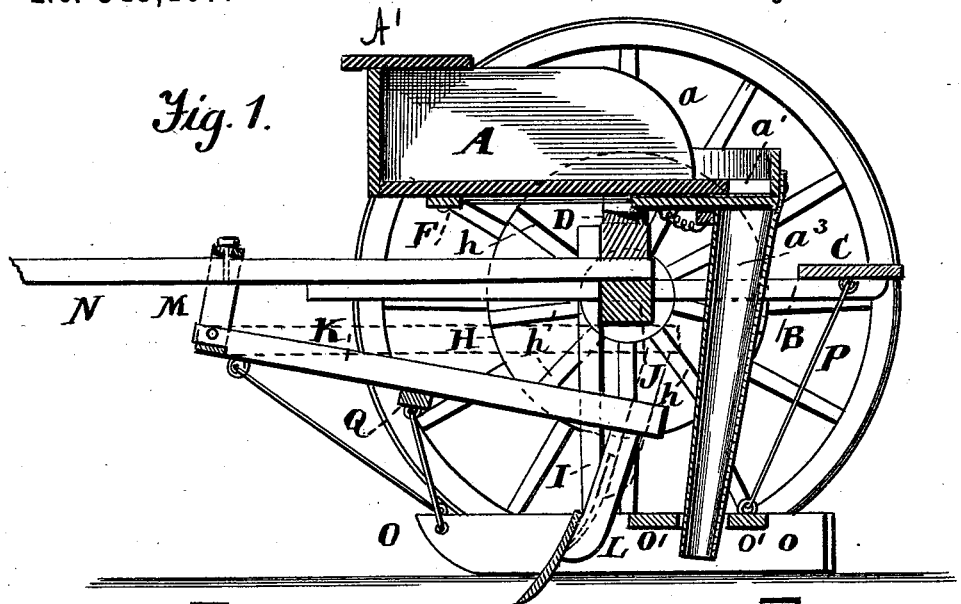
Figure 2:
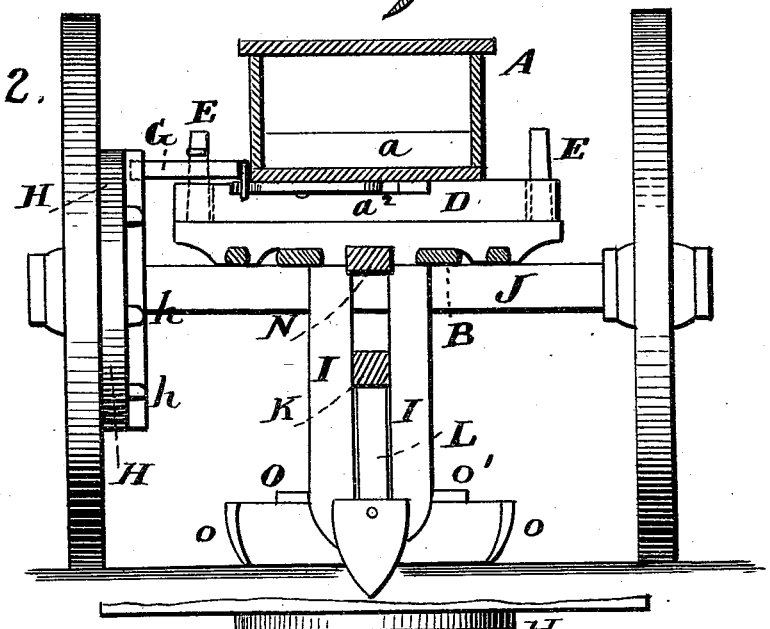
Figure 3:
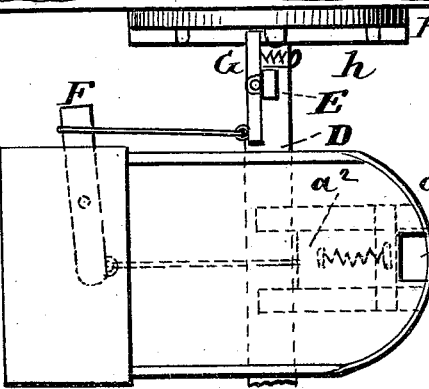

Figure 1 of the drawings is a longitudinal vertical section; Fig. 2, a vertical cross-section, and Fig. 3 a detail plan view.

In the drawings, A represents the body of the planter, with a driver's seat A' on the front end and at its rear end the seed-hole $a'$, the dropping-slide $a^2$, and the suspended discharge-spout $a^3$.

To the rear of box or body A is arranged on bars B B, supported on the axle, a dropper's seat C, and on the standards E E is fitted the end-slotted cross-bar D, which is made fast to the bottom of the body A.

The dropper-slide $a^2$ is flexibly connected with the lever F, fulcrumed on the bottom of box A, and the lever itself in the same way with the trip-bar G, which is struck by the studs or pins $h$ on a disk H fixed on the hub of one of the ground-wheels. The dropper, who sits on the seat C, drops one potato or piece of potato into the seed-hole $a'$ in the slide $a^2$, and waits until this has been discharged into the furrow before he drops another. The operative mechanism of the drop-slide actuates the latter at regular intervals, so as to distribute the potatoes at a uniform distance apart in the furrow.

I I are parallel guides hanging vertically from the axle J, while the rear of the plow-beam K is adjustable vertically between these guides, so as to regulate the depth of the furrow and prevent lateral displacement.

The front end of beam K is pivoted to a yoke M which swings forward and back under the pole N. By pulling the plow-beam forward and raising or lowering the rear end thereof the depth of adjustment of the furrow may be accurately obtained when the beam is pushed back against the guides I I.

O is the coverer, which preferably consists of two converging bars $o$ $o$, connected by the cross-strips $o'$, and is suspended at the rear from the dropper's seat C by a cord or wire P, while the front end is not only suspended by wires or cords from the front end of the plow-beam, but also from a cross-bar Q made fast to the under side of said beam. Thus it will be readily seen that the coverer must always be correspondingly adjusted whenever the plow-beam is moved up or down.

What I claim as new, and desire to protect by Letters Patent, is—

The swinging pole-yoke M pivotally connected with the front of beam K, in combination with the axle guides I I; whereby said beam may be adjusted between said guides to regulate the depth of furrow in the manner described.

In testimony whereof I affix my signature in presence of two witnesses.

MELVEN J. SMITH.

Witnesses:
W. H. SCOTT,
FRED KINDE.